UNITED STATES PATENT OFFICE.

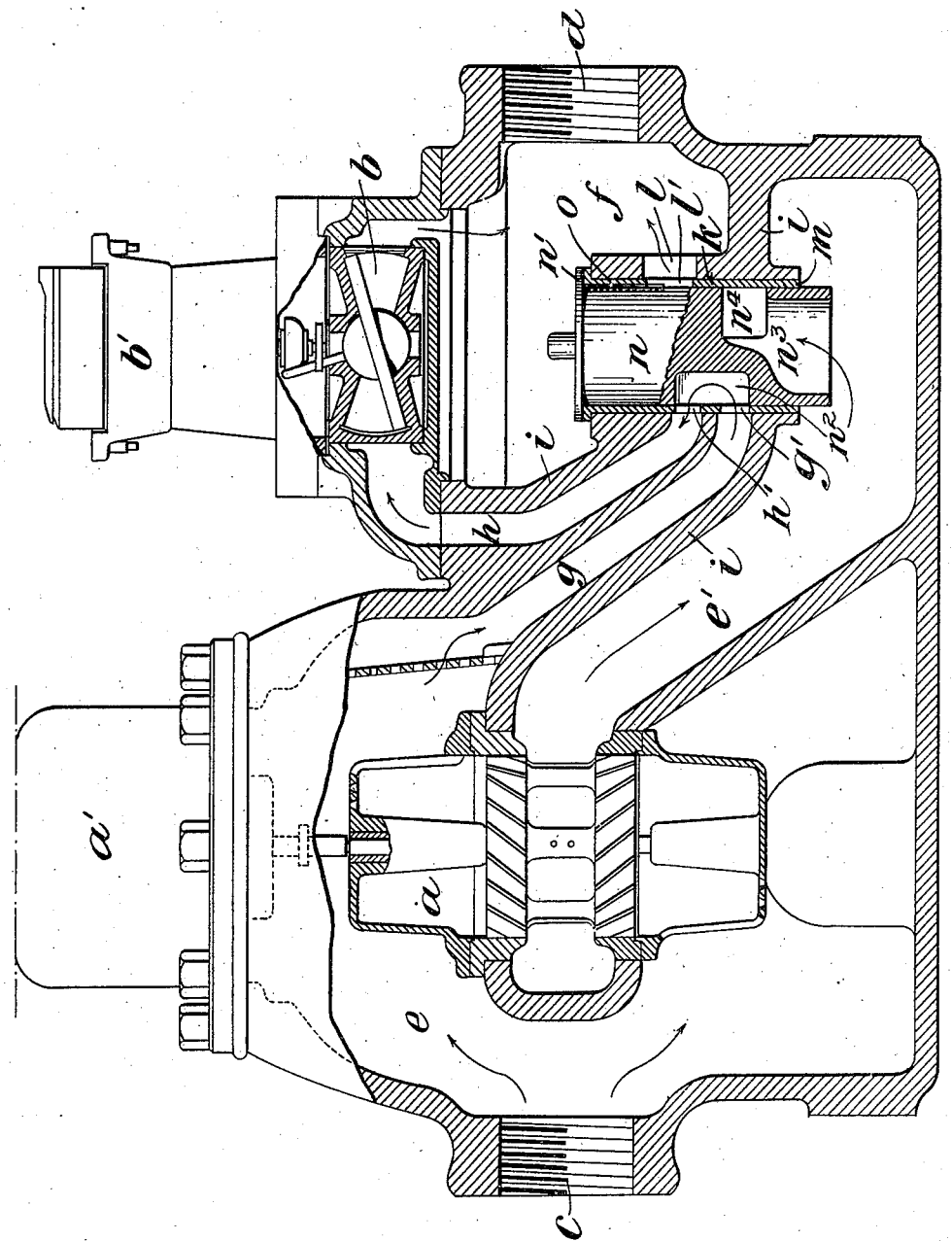

HENRY I. DILTS, OF NEW YORK, N. Y., ASSIGNOR TO NEPTUNE METER COMPANY, OF NEW YORK, N. Y., A CORPORATION OF NEW JERSEY.

WATER-METER.

966,317.  Specification of Letters Patent.  Patented Aug. 2, 1910.

Application filed March 18, 1910.  Serial No. 550,256.

*To all whom it may concern:*

Be it known that I, HENRY I. DILTS, a citizen of the United States, residing in Long Island City, in the borough of Queens of the city of New York, in the State of New York, have invented certain new and useful Improvements in Water-Meters, of which the following is a specification, reference being had to the accompanying drawing, forming a part hereof.

This invention relates to compound water meters in which a high-duty metering device and a low-duty metering device are combined, a valve, operated by variations in the pressure differential, acting to permit the flow through one of such meters, and to prevent the flow through the other of such meters, and it is particularly concerned with the construction of the valve by which the flow through one meter or the other is determined.

In accordance with this invention a single valve body, located in a suitable valve chamber, is itself so chambered or provided with channels and ports and so coöperates with the channels or branches of the conduit through which the liquid flows in its passage from the common inlet to the common outlet through the several metering devices, as to control directly the flow of the liquid through one or the other of such metering devices.

The invention will be more fully explained hereinafter with reference to the accompanying drawing which presents a view, partly in elevation and partly in vertical section, of a compound meter which embodies the invention.

As in the structure represented in the drawing, the relatively high-duty metering device $a$ and the relatively low-duty metering device $b$, are preferably, although not necessarily, combined in a single structure. These metering devices, moreover, may be of any suitable character, the metering device $a$ being shown as of the turbine type, which is well adapted to register accurately large flows of liquid, while the metering device $b$ is of the nutating disk type, which is well adapted to register accurately small flows of liquid. The metering devices are respectively provided, as usual, with registering mechanisms, as at $a'$ and $b'$. In the structure shown, there is a common inlet or inflow opening for the liquid at $c$ and a common outlet or flow at $d$. The liquid which enters at the inlet $c$ passes into a chamber $e$ from which, according to the position of the valve hereinafter referred to, it flows either through that branch of the common conduit which includes the high-duty metering device $a$ and the channel $e'$, into the chamber $f$, whence it escapes through the outlet $d$, or through that branch which includes the channel $g$, the channel $h$ and the low-duty metering device $b$, directly into the chamber $f$. Between the channel $e'$ and the chamber $f$ is a wall $i$ in which are formed the channels $g$ and $h$ and a valve chamber $k$ provided with a port $l$ which opens into the common outlet chamber $f$. The valve chamber $k$ is preferably cylindrical and may be provided with a lining sleeve $m$ which has ports $g'$, $h'$ and $l'$, corresponding respectively with the channels $g$ and $h$ and the port $l$ above mentioned. In the valve chamber $k$ is a valve body $n$ which is freely movable vertically, its downward movement being limited by a flange $n'$, which rests upon the sleeve or lining $m$ and indirectly upon the wall in which the valve chamber $k$ is formed. The valve body $n$ is chambered, as at $n^2$, so as to establish communication between the channels $g$ and $h$ when the valve body is in its lowest position, as shown in the drawing, the communication between these two channels being cut off when the valve body is lifted by an increase in the pressure differential between the inflow and the outflow. The valve body is also chambered from its lower end, as at $n^3$, in communication with the branch or channel $e'$, such chamber $n^3$ having a port $n^4$, which, when the valve body $n$ is raised by an increase in the pressure differential, registers with the port $l$ and places the branch $e'$ in direct communication with the chamber $f$, at the same time preventing the flow of liquid through the channels $g$ and $h$ as already described. If the valve body $n$ is cylindrical, as is preferable, a key $o$ is provided to prevent rotation of the valve body in its chamber.

The operation of the valve will be readily understood in view of the foregoing description of the construction and of the functions of the several features. When the flow of liquid is relatively small and the pressure differential between the inlet and the outlet is relatively small and insufficient to raise the valve body n, the flow of liquid through the high-duty meter a will be prevented and the flow of liquid through the low-duty meter b will be permitted, while if the pressure differential increases sufficiently to lift the valve body n, the flow of liquid through the low-duty meter b will be prevented and the flow through the high-duty meter a will be permitted. It will be observed that in the embodiment of the invention shown in the drawing, the flow of liquid through the high duty meter is prevented by shutting off the branch in which it is located between the meter and the outlet, while the flow of liquid through the low-duty meter is prevented by shutting off the branch between the inlet and the low-duty meter, this relative arrangement being desirable for manufacturing reasons although not essential.

I claim as my invention:

1. The combination of a relatively high-duty meter, a relatively low-duty meter, a common conduit having branches in which the two meters are respectively located, the inflow and the outflow being common to both branches, a single valve chamber having lateral and end openings communicating with both branches and with the common outflow, a valve body located in said valve chamber and chambered to permit flow when in one position through one branch and to prevent flow through the other branch and, in the other position to prevent flow through the first mentioned branch and to permit flow through the last mentioned branch.

2. The combination of a relatively high-duty meter, a relatively low-duty meter, a common conduit having branches in which the two meters are respectively located, the inflow and the outflow being common to both branches, a wall located between the branch which includes the high-duty meter and the common outflow, said wall having therein a valve chamber having a port for communication with the common outflow and also having therein two channels which communicate respectively with the common inflow and the low-duty meter while both communicate with said valve chamber, and a valve body located in the valve chamber and chambered to establish communication between said channels when in one position and to establish communication between the channel of the high-duty meter and the outflow when in another position.

This specification signed and witnessed this 11th day of March, A. D. 1910.

HENRY I. DILTS.

Signed in the presence of—
ELLA J. KRUGER,
AMBROSE L. O'SHEA.